United States Patent [19]

Jeindl

[11] Patent Number: 4,690,190
[45] Date of Patent: Sep. 1, 1987

[54] SECURING DEVICE FOR A VEHICLE TIRE CHAIN

[75] Inventor: Ferdinand Jeindl, Graz, Austria

[73] Assignee: Steirische Kettenfabriken Pengg-Walenta KG, Graz, Austria

[21] Appl. No.: 693,684

[22] Filed: Jan. 22, 1985

[30] Foreign Application Priority Data

Jan. 20, 1984 [DE] Fed. Rep. of Germany ....... 3401972

[51] Int. Cl.$^4$ ............................................. B60C 27/06
[52] U.S. Cl. .................. 152/213 A; 24/602; 24/651; 24/664; 24/666; 24/701; 152/218; 152/239; 152/242
[58] Field of Search ............... 152/242, 241, 239, 231, 152/208, 213 R, 217-219, 220, 213 A; 24/664, 666, 698, 700, 701, 588, 602, 629, 651, 662

[56] References Cited

U.S. PATENT DOCUMENTS 1,745,273  1/1930  Romain ........................... 152/242 X
2,767,760  10/1956 Granger .......................... 152/242 X
4,542,779  9/1985  Müller et al. .................... 152/242 X
4,588,010  5/1986  Melzi et al. ..................... 152/242 X Primary Examiner—Donald E. Czaja
Assistant Examiner—Thomas Bokan
Attorney, Agent, or Firm—Spencer & Frank

[57] ABSTRACT

A tire chain adapted to be mounted on and readily removed from a vehicle tire includes an inner support extending, in the mounted state of the chain, circumferentially along and in engagement with an inwardly oriented tire side. The inner support has a spring steel yoke including adjacent opposite free yoke ends and a hook lock having cooperating first and second components mounted on the opposite yoke ends, respectively and adapted to selectively assume an interengaged, closed state or a disengaged, open state. The first component is a flat, quadrangular eyelet defining an eyelet plane oriented such that in the mounted state of the tire chain the eyelet lies flat against the side wall of the tire and further, the second component is a flat hook defining a hook plane oriented perpendicularly to the eyelet plane.

7 Claims, 3 Drawing Figures

SECURING DEVICE FOR A VEHICLE TIRE CHAIN

BACKGROUND OF THE INVENTION

This invention relates to a chain for vehicle tires and is of the type which has an inner and an outer support engaging, in the mounted state of the chain, the inner and, respectively, outer sides of the tire and which further has a plurality of spaced runner chains straddling the running face of the tire. Both the inner and the outer support may be opened and closed and further, the inner support comprises an open spring steel yoke which is provided with a hook-type lock for securing the yoke ends to one another.

Tire chains of the above-outlined known type may be mounted by the user in a simple manner on the vehicle tire by bending open the spring steel yoke with both hands, passing it across the circumference of the tire, whereupon the spring steel yoke engages the inner side wall of the tire and assumes, upon manual release, its original position.

Since, however, the inner side of the wheel can generally not be seen by the user, the opening and closing of the hook lock whose parts are situated at the free ends of the spring steel yoke, involve difficulties.

A great variety of locking structures have already been proposed to replace a simple hook-and-eyelet lock. One of such securing arrangements includes magnets at both sides, whereby the separated parts may orient themselves, that is, they may locate one another with the aid of magnetic forces. According to another solution, one securing part has a funnel-like configuration which may receive and hold the hook-like other end of the spring steel yoke in a ready and simple manner.

While the above-outlined known solutions may, to be sure, facilitate the joining of the separated parts of the yoke lock, difficulties and disadvantages are involved with the opening operation. As a remedy, it has been proposed heretofore only to provide color markings on the outer (visible) support of the tire chain to serve as a reference from which the user may receive indication concerning the position of the hook lock and the direction of operation.

SUMMARY OF THE INVENTION

It is an object of the invention to provide an improved securing (locking) device for the inner support (spring steel yoke) of a vehicle tire chain which is of simple and robust construction and which makes possible a closing and, in particular, an opening of the securing parts by the user in a simple manner without the aid of markings or without the necessity of ascertaining manually the position of the securing members and further, the securing device is of such a simple construction that neither soiling nor icing can adversely affect the opening of the securing connection.

This object and others to become apparent as the specification progresses, are accomplished by the invention, according to which, briefly stated, the tire chain adapted to be mounted on and readily removed from a vehicle tire includes an inner support extending, in the mounted state of the chain, circumferentially along and in engagement with an inwardly oriented tire side. The inner support has a spring steel yoke including adjacent opposite free yoke ends and a hook lock having cooperating first and second components mounted on the opposite yoke ends, respectively and adapted to selectively assume an interengaged, closed state or a disengaged, open state. The first component is a flat, quadrangular eyelet defining an eyelet plane being parallel to the eyelet flatness and being oriented such that in the mounted state of the tire chain the eyelet lies flat against the side wall of the tire and said eyelet plane being oriented perpendicularly to a rotary axis of the vehicle tire and further, the second component is a flat hook defining a hook plane oriented perpendicularly to the eyelet plane.

The above-outlined construction of the hook-and-eyelet locking assembly according to the invention provides that upon bringing the ends of the spring steel yoke towards one another, the hook and the eyelet abut one another and the user may, without seeing or feeling the position of the parts, secure the hook into the four-sided eyelet without any risk that the securing parts are moved past one another without contacting.

According to a further feature of the invention, the inner and outer sides of the rectangular or, more specifically, parallelogram-shaped eyelet are constituted by parallel inner and outer webs inclined with respect to a radius passing through the center of the eyelet and belonging to the circular central line of the spring steel yoke. The angle formed by the outer edge of the outer web and the radius points towards the wheel axis (that is, toward the center of the circular mid-line of the spring steel yoke) and opens in the direction of the eyelet. When the user moves the free ends of the spring steel yoke towards one another with both hands, as the compressing force increases, the hook may not pass by the eyelet radially outwardly, but is constrained to move inwardly and thus is guided into the eyelet until it snaps over the outer web of the eyelet and is secured thereon. A parallelogram-shaped configuration of the eyelet has the advantage that the outer web, with its outer terminal edge, projects relatively far outwardly and may thus better receive the hook which is also oriented in the outward direction.

In accordance with a further feature of the invention, the longitudinal axis of the hook is oriented perpendicularly to the longitudinal axis of the outer web of the eyelet. By means of this arrangement the terminal edge of the hook may glide up more easily on the outer edge of the outer eyelet web.

According to a further advantageous feature of the invention, the inner edge of the outer web has an inclined surface whose highest (outermost) point is, with respect to the outer edge of the outer web, offset towards the tire axis. By virtue of such a construction of the inner edge of the outer web, the hook, despite a relatively large opening of the eyelet, remains immobilized in the locked (engaged) state, that is, even in response to centrifugal forces or the like, its locked position does not change (that is, the hook does not shift within the eyelet).

According to a further feature of the invention, the hook has an inclined outer edge face, whose highest point is located diagonally opposite the hook opening. By virtue of this arrangement a gliding of the hook onto the outer edge of the outer eyelet web is significantly facilitated such that the user, without seeing the securing components, can move the hook only towards interengagement between hook and eyelet.

According to still another feature of the invention, the hook is, with respect to the circular mid line of the spring steel yoke, offset towards the side where the tire wall extends in the mounted state of the tire chain. The offsetting part of the hook has an inner surface which extends parallel to the inclined outer edge face of the hook. By means of this arrangement it is ensured that when the yoke ends are manually forced together during the disengaging step, there is a camming action not only between the outer edge of the hook and the inner edge of the inner eyelet web, but also, at the same time, between the inner surface of the offsetting part of the hook and the outer edge of the outer web of the eyelet to thus significantly facilitate the opening (disengaging) step.

DESCRIPTION OF THE PREFERRED EMBODIMENT

Figure 1:
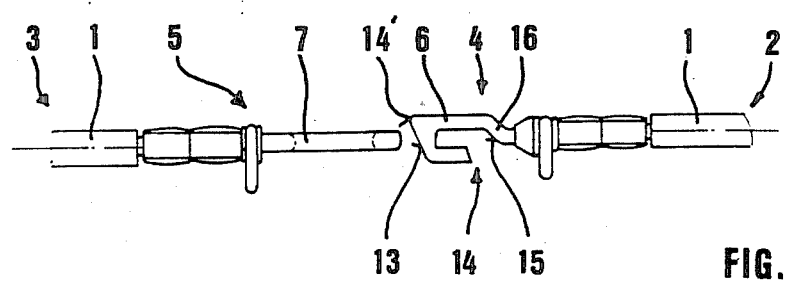
FIG. 1 is a top plan view of a preferred embodiment of the invention illustrated in a disengaged state.
Figure 2:
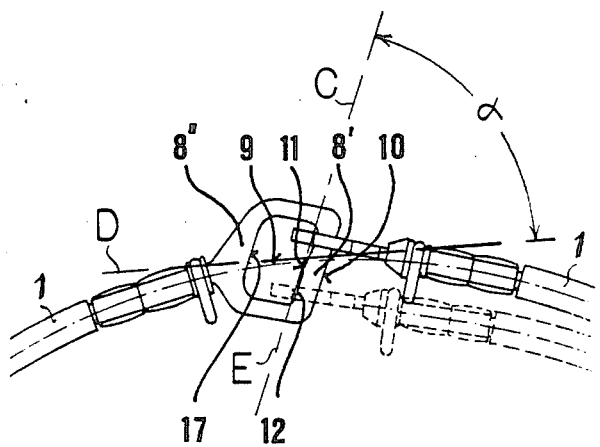
FIG. 2 is a side elevational view of the preferred embodiment illustrated in the engaged state.

Turning to FIGS. 1 and 2, there is shown an inner support 1 of a vehicle tire chain. The support 1 is essentially formed of an approximately circular, open spring steel yoke, whose free end portions 2 and 3 have respective securing components 4 and 5 formed as a hook 6 and an eyelet 7 which are of flat, planar construction as seen by a comparison of FIGS. 1 and 2. The hook 6 is generally elongated and has a length dimension oriented towards the eyelet 7. The yoke 1 is adapted to lie against the inner tire wall such that the center of the circular center line 9 of the yoke 1 is in the zone of the tire axis (wheel axis).

The eyelet 7 has a generally parallelogram shape whose outer web 8' and inner web 8" is inclined with respect to a line which is a radius of the circular center line 9 and which passes through the middle of the eyelet 7. According to this arrangement an angle formed by the outer edge 10 of the outer web 8' and the radius points towards the wheel axis and is open towards the eyelet 7.

The inner edge 11 of the outer web 8' has an inclined surface whose highest point 12 is, with respect to the outer edge 10 of the web 8' offset towards the tire axis (yoke center).

The hook 6 has a plane which contains the length dimension of the hook and which lies parallel to the hook flatness. Such a hook plane is oriented at 90° to that of the flat eyelet 7. Thus, for example, in FIG. 1, the plane of the hook 6 is coextensive with the plane of the drawing figure while the plane of the eyelet 7 is perpendicular thereto. In this manner, the hook 6, with its inclinded outer edge face 13 may glide up on the outer edge 10 of the web 8' of the eyelet 7. The highest point 14' of the outer edge face 13 is located diagonally opposite the hook opening 14, so that the hook 6, upon manually pushing the securing components 4 and 5 towards one another, is automatically lifted (camming action) in a sense that the hook opening 14 approaches the outer eyelet web 8' for interengagement.

Further, the longitudinal axis of the hook 6 is perpendicular to the longitudinal axis of the outer web 8', whereby the outer edge face 13 of the hook 6 may glide up more readily onto the outer edge 10 of the web 8'.

Further, the hook 6 is offset with respect to the spring steel yoke 1, particularly with respect to its circular center line 9 toward the side where the tire wall is located in the mounted state of the chain, so that the securing components 4 and 5, in their engaged state, lie in the center line 9 of the spring steel yoke 1. Further, the inner edge face 15 of the offsetting portion 16 of the hook 6 is inclined and extends parallel to the outer edge face 13 of the hook 6.

For closing or opening the spring steel yoke 1 the user, with both hands, grasps the respective end portions 2 and 3 of the spring steel yoke 1 at a distance from the securing parts 4 and 5 behind the tire and pushes the ends together, whereby the securing components 4 and 5, because of the inherent rigidity of the spring steel yoke in a direction transverse to the plane in which the circular center line 9 lies, are maintained in alignment with one another. Thus, for effecting locking, the user presses the securing components 4 and 5 towards one another with both hands, whereupon the hook 6, with its outer edge 13, rides up on the outer edge 10 of the eyelet 7 and upon continuing compression, snaps into the eyelet 7 by hooking into the web 8'. During this step, again by virtue of the inherent rigidity or bias of the spring steel yoke 1, the hook 6 glides on the inclined edge 11 of the web 8' radially outwardly within the eyelet 7 from the phantom-line position into the solid-line position of FIG. 2. This radially outer position of the hook 6 is maintained also in the presence of centrifugal forces. Thus, the hook 6 is secured in its radially outer position, shown in solid lines in FIG. 2 by virtue of the inclined course of the inner edge 11 of the outer web 8'. The inclination of the edge 11 may be defined as sloping towards the hook supporting end of the spring steel yoke 1 as viewed in a radially outward direction of the circular center line 9. Or, stated differently, the inclined course C of the edge 11, as viewed in a radially outward direction, forms an acute angle a with a tangent D drawn to the point of intersection E between the edge 11 and the circular center line 9. The tangent D is viewed in the direction toward the yoke end which carries the hook 6. Such a particular oblique positioning of the edge 11 means that the hook 6, in order to move away from its solid line position shown in FIG. 2, has to "climb up" the rising slope of the edge 11 and thus overcome substantial resisting camming forces. The relatively long outer edge 10 of the web 8' of the eyelet 7 ensures that the user may bring the hook 6 without actually seeing it, into the engaging position since the hook 6, by virtue of the inherent rigidity of the spring steel yoke and by virtue of the length of the web 8' glides thereon with the outer hook edge 13 thereof and searches the opening of the eyelet 7. Thus, upon compressing the securing components 4, 5, the hook 6 may not be move outwardly past the eyelet 7.

Figure 3:
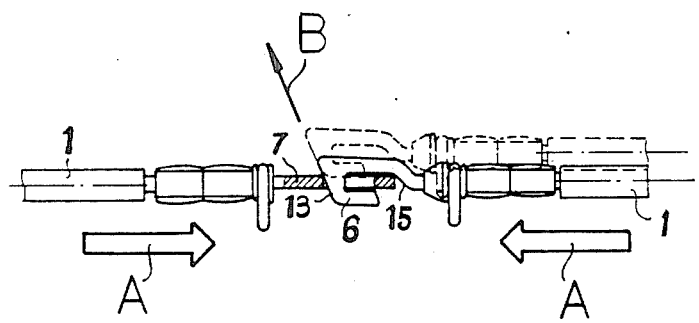
FIG. 3 is a top plan view of the preferred embodiment, illustrating movements of parts during disengagement.

Turning now to FIG. 3, there is illustrated the simple disengaging step of the securing arrangement. Again, the yoke ends 2, 3 and thus the securing components 4 and 5 are manually pressed towards one another in the direction of the arrows A. In this case, the hook 6 glides, with its inclined outer edge 13 on the inner edge 17 of the inner web 8" of the eyelet 7 by camming action transversely to the plane of the flat eyelet 7 in the direction of the arrow B, and the outer edge 10 of the outer web 8' also rides up on the inclined inner edge 15 of the offsetting portion 16 of the hook 6. As the hook 6 reaches its disengaged position shown in phantom lines, the manual pressure in the direction of the arrows A is released while a manual pressure in the general direction of arrow B is maintained briefly to ensure that the hook 6 and eyelet 7 remain disengaged as the yoke 1 assumes its relaxed state as shown in FIG. 1.

It will be understood that the above description of the present invention is susceptible to various modifications, changes and adaptations, and the same are intended to be comprehended within the meaning and range of equivalents of the appended claims.

What is claimed is:

1. In a tire chain adapted to be mounted on and readily removed from a vehicle tire including an inner support extending, in the mounted state of the chain, circumferentially along and in engagement with an inwardly oriented tire side; said inner support having a spring steel yoke including adjacent opposite free yoke ends and a hook lock having cooperating first and second components mounted on the opposite yoke ends, respectively and adapted to selectively assume an inter-engaged, closed state or a disengaged, open state; the improvement wherein said first component is a flat, quadrangular eyelet defining an eyelet plane being parallel to the eyelet flatness and being oriented such that in said mounted state the eyelet lies flat against the side wall of the tire and said plane being oriented perpendicularly to a rotary axis of the vehicle tire and further wherein said second component is a flat hook having a hook flatness and a length dimension generally oriented in a direction toward the yoke end on which said quadrangular eyelet is mounted; said flat hook defining a hook plane containing said length dimension; said hook plane being parallel to said hook flatness and being oriented perpendicularly to said eyelet plane.

2. A tire chain as defined in claim 1, wherein said yoke is circular and has a circular centerline having a center point; and further wherein said eyelet has the shape of a generally quadrangular frame having oppositely located, parallel-oriented inner and outer webs; said outer web having an external edge; said webs being oriented obliquely with respect to a radius belonging to said centerline and passing through said eyelet; and the angle formed between said external edge of said outer web and said radius pointing towards said center point and being open towards said eyelet.

3. A tire chain as defined in claim 2, wherein said quadrangular frame is substantially parallelogram shaped.

4. A tire chain as defined in claim 1, wherein said yoke has a generally circular centerline and further wherein said hook has an opening and an external edge oriented towards said eyelet at an oblique angle to said circular centerline; said external edge of said hook having an outermost point located diagonally opposite said opening.

5. A tire chain as defined in claim 4, wherein said hook has a bent portion offsetting said hook with respect to said centerline toward a yoke side adapted to engage the tire in said mounted state; said bent portion having an inner edge extending parallel to said external edge of said hook.

6. A tire chain as defined in claim 2, wherein said outer web includes an internal edge having, in a radially outward direction relative to said circular yoke, an inclined course which forms an acute angle with a tangent drawn to a point of intersection between said internal edge and a said circular center line; said tangent being viewed in a direction toward the yoke end on which said hook is mounted.

7. A tire chain as defined in claim 2, wherein said hook and said outer web have respective longitudinal axes oriented perpendicularly to one another.

* * * * *